F. Meyrose,

Faucet,

N°43,125. Patented June 14, 1864.

Witnesses:
Henry Morris.
J.W. Coombs

Inventor:
Ferdinand Meyrose
per Munn & Co
Attorneys

UNITED STATES PATENT OFFICE.

FERDINAND MEYROSE, OF ST. LOUIS, MISSOURI.

IMPROVEMENT IN FAUCETS.

Specification forming part of Letters Patent No. 43,125, dated June 14, 1864.

*To all whom it may concern:*

Be it known that I, FERDINAND MEYROSE, of St. Louis, in the county of St. Louis and State of Missouri, have invented a new and useful Improvement in Faucets or Cocks; and I do hereby declare that the following is a full, clear, and exact description of the same, reference being had to the accompanying drawings, making a part of this specification, in which—

Figure 1:
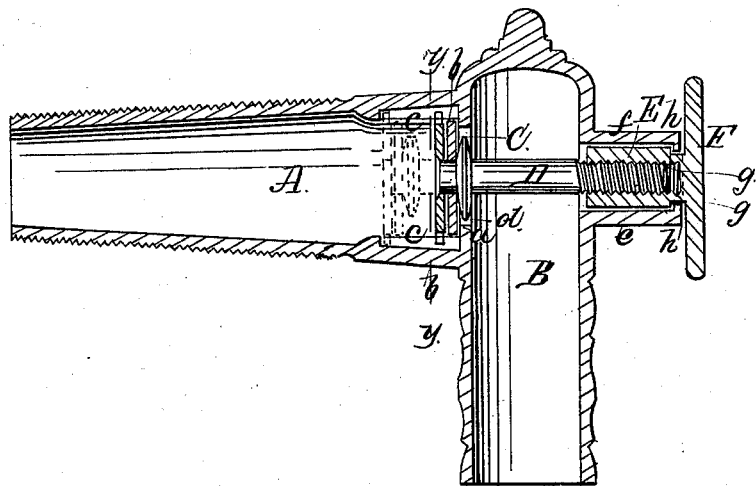
Figure 2:
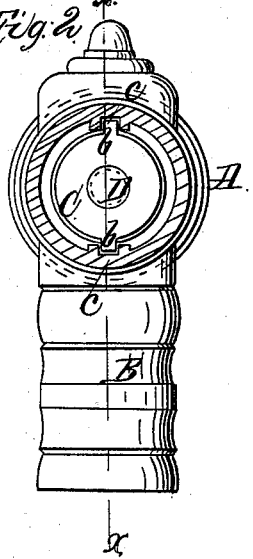

Figure 1 is a side sectional view of my invention, taken in the line $x\,x$, Fig. 2; Fig. 2, a transverse vertical section of the same, taken in the line $y\,y$, Fig. 1.

Similar letters of reference indicate corresponding parts in the two figures.

This invention consists in having a valve placed on or attached to a stem which is fitted horizontally in the case of the faucet or cock, and is operated by a nut so as to open and close the valve, the latter closing against its seat in a direction corresponding with the direction of the pressure of the liquid, and all arranged as hereinafter fully set forth, whereby a very simple and efficient faucet or cock is obtained, and one not liable to leak and which may be opened and closed with the greatest facility.

To enable those skilled in the art to fully understand and construct my invention, I will proceed to describe it.

A represents a horizontal tube, which is the portion of the case of the faucet or cock that is fitted in the cask or vessel.

B is a vertical tube which is at the outer end of A, and communicates with it by an opening, $a$, near the upper end of B.

C is a valve which is fitted vertically in A, and has a projection, $b$, at its upper and lower end, which are fitted in grooves $c\,c$ in the upper and lower part of A at its junction with B. This valve may be provided with packing $d$, and constructed in the usual or in any proper way.

D is the valve-stem, which passes horizontally through B, and has a screw, $e$, on its outer part, on which a cylindrical nut, E, is fitted, said nut being placed and allowed to turn freely in a cylindrical chamber, $f$, attached to and communicating with B. This nut E has a hand-wheel, F, on its outer end, and is provided with a groove, $g$, which is made circumferentially in it at the junction of the wheel F, to receive a flange, $h$, at the outer end of $f$, said flange and groove preventing the nut from working or playing longitudinally in the chamber $f$, as will be understood by referring to Fig. 1. From this description it will be seen that by turning the nut E the valve C will be moved forward or backward in the tube A, the projections $b\,b$ on the valve preventing the latter as well as the valve-stem D from turning under the action of the nut E. When the valve is moved backward, the opening $a$ forms a communication between the two tubes A B, and the liquid consequently will flow through said tubes, and when the valve is moved forward against the tube B the opening $a$ is closed and communication cut off between the two tubes A B. Thus by this simple arrangement a very economical and durable faucet or cock is obtained, one which will not be liable to leak, and which may be readily operated or manipulated and have its valve moved or graduated with the greatest nicety in order to regulate the flow of the liquid in its discharge as desired.

Having thus described my invention, what I claim as new, and desire to secure by Letters Patent, is—

A faucet provided with a valve, C, attached to a horizontal stem, D, having a screw, $e$, on its outer part, on which a nut, E, is fitted, and the latter placed and allowed to turn freely in a cylindrical chamber, $f$, all being arranged in connection with the two tubes A B, substantially as described.

FERDINAND MEYROSE.

Witnesses:
 B. MEYROSE,
 HENRY ROLFES.